US005658635A

United States Patent [19]

Davis et al.

[11] Patent Number: 5,658,635

[45] Date of Patent: Aug. 19, 1997

[54] BULLETIN BOARD AND ACCESSORY ATTACHING MECHANISM

[75] Inventors: Bradley Craig Davis, Irvine; Michael Kaylor Boone, Laguna Beach, both of Calif.

[73] Assignee: Boone International, Inc., Irvine, Calif.

[21] Appl. No.: 526,707

[22] Filed: Sep. 11, 1995

[51] Int. Cl.$^6$ .......... B32B 9/00

[52] U.S. Cl. .......... 428/81; 428/74; 428/192; 428/194; 428/511; 428/455; 428/537.5; 52/27; 52/38; 40/793

[58] Field of Search .......... 428/192, 511, 428/537.5, 74, 194, 455, 81; 52/27, 38; 40/156

[56] References Cited

U.S. PATENT DOCUMENTS 236,457 1/1881 Reimer .
369,663 9/1887 Swaney .
2,158,368 5/1939 Hurt .
2,300,248 10/1942 Elnett .
2,319,278 5/1943 Urbain .
2,651,852 9/1953 Urbain .
3,008,249 11/1961 Masters .
3,363,341 1/1968 Glassman .
4,133,123 1/1979 Anderson .
4,428,135 1/1984 Sobel .

*Primary Examiner*—Patrick Ryan
*Assistant Examiner*—Abraham Bahta
*Attorney, Agent, or Firm*—Lyon & Lyon LLP

[57] ABSTRACT

A message board comprising a bulletin board fixedly mounted on a backing of heavy cardboard or other substrate, and an optional dry-erase laminate fixedly mounted onto the bulletin board. A frame is fixedly secured to the edges of the bulletin board and backing. The frame is provided with a front channel and a rear channel, each adapted to receive and firmly retain a portion of a generally "C"-shaped grip. The grip may be integrally formed with various accessories desired to be attached to the frame of the message board.

21 Claims, 3 Drawing Sheets

BULLETIN BOARD AND ACCESSORY ATTACHING MECHANISM

FIELD OF THE INVENTION

This invention relates to the field of message boards, and more particularly relates to message boards having attachable accessories and mechanisms for attaching such accessories.

BACKGROUND OF THE INVENTION

Various forms of message boards are known in the art. The conventional bulletin board, which is generally made from a cork or other tack penetrable material, has been used to pin or tack notes or other things to it. Other message boards include dry-erase boards which are essentially smaller versions of the big dry-erase boards used like blackboards (or more accurately "white" boards) in offices and elsewhere. A combination bulletin and dry-erase message board is the subject of Applicant's currently pending U.S. patent application Ser. No. 08/363,649.

In addition to the various materials used to comprise the surfaces of these message boards, it has also been known to attach various accessories to the surfaces and edges of the message boards. Trays, storage receptacles, and various types of holders are typical of these types of accessories. These accessories are typically attached to the frames and surfaces of the message boards by adhesive bonding, nailing, screwing, and similar techniques, or, alternatively, by detachably securing the accessory to the frame. Many of these arrangements are relatively complicated or cumbersome to use, and many do not provide a firm attachment such that the accessory is held firmly to the frame of the message board by a positively locking mechanism.

SUMMARY OF THE INVENTION

It is accordingly a principal object of the present invention to provide an improved message board having a frame adapted to receive and firmly retain various accessories in a convenient manner.

In a first aspect, a message board comprises a bulletin board fixedly mounted on a backing of heavy cardboard, or other substrate, and a dry-erase laminate fixedly mounted onto the bulletin board. Alternatively, the message board may comprise a bulletin board alone, a dry-erase laminate alone, or a combination of the two. The message board further comprises a frame fixedly secured to the edges of the bulletin board and backing, the surfaces of the frame defining a front channel and a rear channel extending preferably over the entire frame. The front channel and rear channel of the frame are adapted to receive and firmly retain a grip in a manner that provides for easy attachment and detachment of the grip.

In a second aspect, a grip comprises a generally "C"-shaped body having a tip at one end and a lip extension at the other end. The tip is adapted to engage the front channel of the frame, while the lip extension is adapted to engage the rear channel of the frame, to thereby retain the grip on the frame. Various accessories designed to be attached to the frame are formed integrally with the grip.

Further objects and advantages of the present invention will become apparent from a consideration of the drawings and ensuing description.

DETAILED DESCRIPTION OF THE PREFERRED EMBODIMENT

Turning now to the drawings, a message board 10 according to the present invention comprises a square or rectangular bulletin board 12 occupying the central portion of the board. The bulletin board 12 may comprise a cork board, synthetic cork board, tile board, or fiber board, any of which may be covered by a coarse fabric if desired. A dry-erase surface or laminate (not shown) may be used in addition to, or instead of, the bulletin board 12. The laminate preferably comprises porcelain coated paper, masonite or metal. The laminate can be used for writing notes and messages, just like a conventional dry-erase board, whereas the bulletin board 12 can have notes or other things pinned to it. The front surface of the message board 10 may comprise a bulletin board 12 alone, a laminate alone, or a combination of a portion comprising a bulletin board 12 and a portion comprising a laminate.

Figure 2:
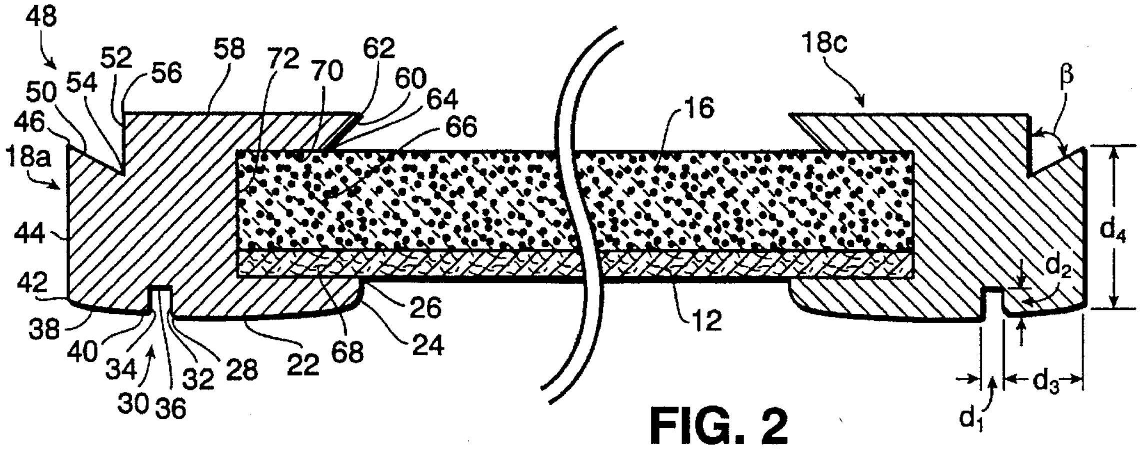
FIG. 2 is a cross-sectional view of the message board of FIG. 1, taken along the line 2—2 in FIG. 1.

Referring to FIG. 2, the above embodiment is preferably constructed by fixedly mounting the bulletin board 12 onto a heavy cardboard backing 16, or some other substrate or backing material. The laminate is, in ram, fixedly mounted onto the bulletin board 12 if desired. For convenience, the embodiment described below will comprise a bulletin board 12 alone, with no laminate.

Figure 1:
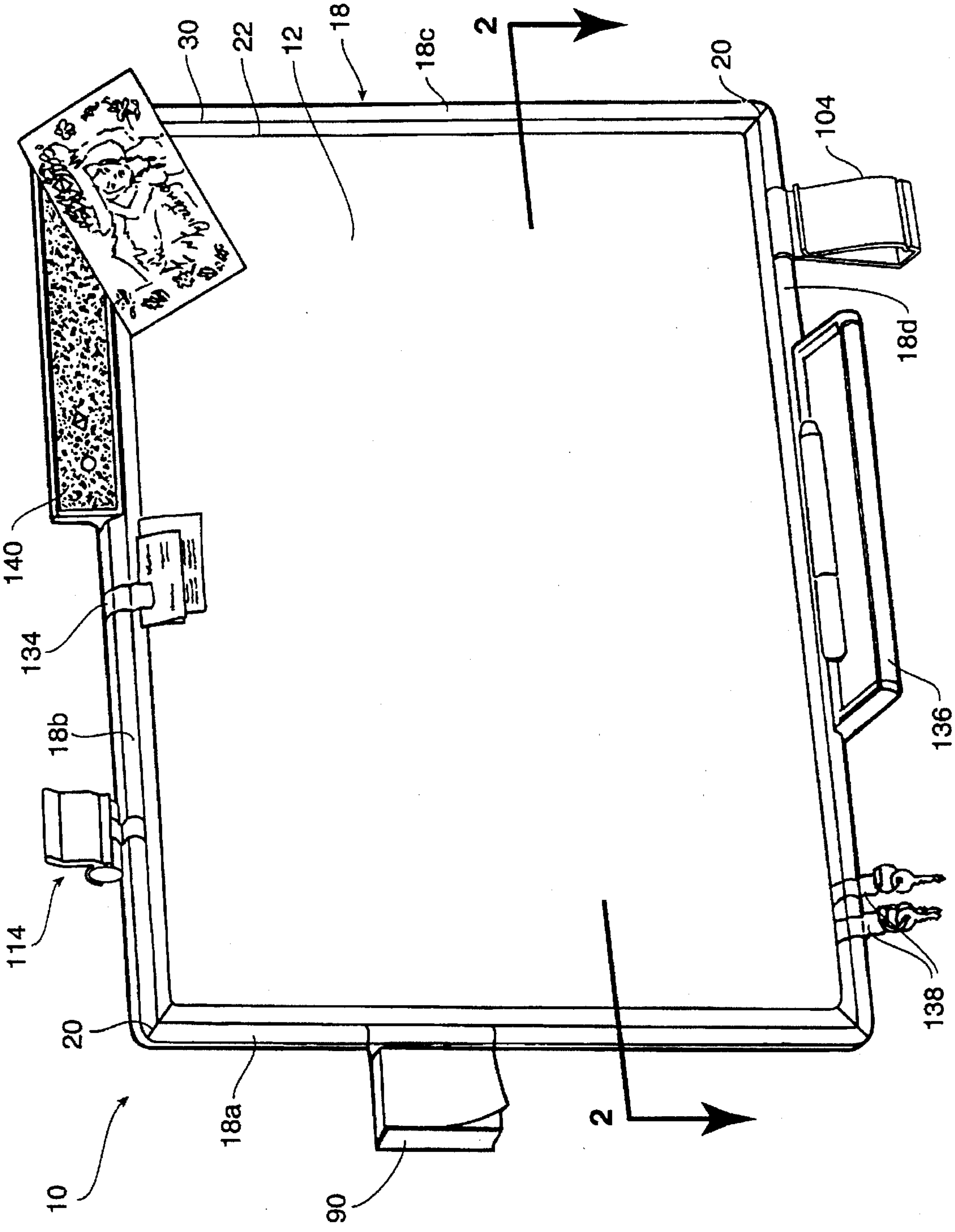
FIG. 1 is a perspective view of a message board in accordance with a preferred form of the present invention.

Referring now to FIG. 1, a frame 18 extends completely around the periphery of the bulletin board 12. The frame 18 comprises four separate frame sections 18*a*, 18*b*, 18*c* and 18*d*, one frame section secured to each side of the square or rectangular bulletin board 12. Each frame section 18*a*–18*d* is mitered at both ends, in a manner well known in the art, to form a corner 20 with each adjacent section when the frame 18 is assembled. The frame 18 preferably comprises wood, but may also be constructed of injection molded plastic, extruded aluminum, or other suitable material.

Turning now to FIG. 2, a cross-section of two sections 18*a* and 18*c* of the frame 18 are illustrated such that the details of the frame sections 18*a* and 18*c* can be described, it being understood that the other frame sections 18*b* and 18*d* are of like construction. For convenience, the surfaces of the frame sections 18*a* and 18*c* will be described in two dimensions relative to horizontal planes and vertical planes. Horizontal planes are here defined as the plane within which lies the bulletin board 12 and all planes parallel to that plane, while vertical planes are all planes perpendicular to the horizontal planes.

The frame section 18*a* comprises a solid member defining a number of surfaces, the surfaces further defining three channels: a front channel 30, a rear channel 48, and an internal channel 66. The front channel 30 and rear channel 48 of the frame section 18*a*provide the frame 18 with the capability to receive and retain a grip that is associated with an accessory, thus providing the capability of snapping accessories onto the frame 18, as more fully described below. The internal channel 66 is adapted to receive and retain the bulletin board 12 and backing 16 to thereby connect the frame 18 to the bulletin board 12.

As shown in FIG. 2, the frame section 18*a* comprises a front inside surface 22 that extends in a horizontal plane over most of its length. The front inside surface 22 has an upward curving portion 24 that curves upward, or toward the front surface of the bulletin board 12, and that terminates at a corner 26 shared with an internal channel front side surface 68. At the end of the front inside surface 22 opposite the upward curving portion 24, the front inside surface 22 terminates at a corner 28 shared with a front channel inside surface 32 of the front channel 30.

The front channel 30 is defined by a pair of front channel side surfaces 32 and 34 and a front channel bottom surface 36. The front channel side surfaces 32 and 34 lie in parallel vertical planes and are separated by a distance $d_1$, which in the preferred embodiment is 0.069", while the front channel bottom surface 36 lies in a horizontal plane a distance $d_2$, which in the preferred embodiment is 0.078", above the corner 40 shared between the front outside surface 38 and the outer of the front channel side surfaces 34. The front channel side surface 32 adjacent the front inside surface 22 is slightly longer than the front channel side surface 34 adjacent the front outside surface 38, i.e., the front channel side surface 32 has a length greater than $d_2$, with the result that the corner 28 shared between the front inside surface 22 and the front channel side surface 32 lies in a horizontal plane slightly below the horizontal plane in which lies the corner 40 shared between the front outside surface 38 and the front channel side surface 34. In other words, the corners 28 and 40 are slightly offset, with the corner 40 being slightly above the corner 28. The corners formed by the two front channel side surfaces 32 and 34 with the front channel bottom surface 36 are preferably slightly rounded, but may be square.

The frame section 18*a* further comprises a front outside surface 38 and an end surface 44. The front outside surface 38 extends from a corner 40 shared with the outer of the front channel side surfaces 34 to a corner 42 shared with the end surface 44 of the frame section 18*a*, and has an overall length of $d_3$. In the preferred embodiment, $d_3$ is 0.294". The front outside surface 38 does not lie in a horizontal plane, but is slightly upwardly curved, as shown in FIG. 2. The slight upward curve of the front outside surface 38 is to facilitate attachment and detachment of accessories, as more fully described below. The corner 42 formed by the front outside surface 38 and the end surface 44 is slightly rounded. The end surface 44 is substantially planar, lying in a vertical plane, and having a length $d_4$. In the preferred embodiment, $d_4$ is 0.512". The end surface 44 extends from the rounded corner 42 shared with the front outside surface 38 to a rounded corner 46 shared with the rear channel 48.

The rear channel 48 is defined by a first rear channel side surface 50, a second rear channel side surface 52, a rear channel corner 54, the corner 46 shared with the end surface 44, and a corner 56 shared with the rear surface. The first rear channel side surface 50 is declined an angle β from the vertical and extends from the rounded corner shared with the end surface 46 to the rear channel corner 54 that joins the first rear channel surface 50 with the second rear channel side surface 52. The second rear channel side surface 52 lies in a vertical plane, and extends from the rear channel corner 54 to the rounded corner 56 shared with the rear surface 58. Because the first rear channel side surface 50 is inclined by an angle β from the vertical, and the second rear channel side surface 52 is vertical, the first rear channel side surface 50 and second rear channel side surface 52 together define an acute angle β. Angle β is preferably about 59°.

The frame section 18*a* further comprises a rear surface 58 and a back edge 60. The rear surface 58 is generally planar, lying in a horizontal plane and extending from the corner 56 shared with the second rear channel side surface 52 to a corner 62 shared with the back edge 60. The back edge 60 is also generally planar, lying in a plane that is inclined by an angle ϵ from the horizontal plane. The back edge 60 extends from the corner 62 shared with the rear surface 58 to a corner 64 shared with one of the side surfaces of the internal channel 66.

The internal channel 66 is defined by a pair of internal channel side surfaces 68 and 70 and an internal channel bottom surface 72. The internal channel side surfaces 68 and 70 lie in parallel horizontal planes, while the internal channel bottom surface 72 lies in a vertical plane outside the corner 64 shared by the back edge 60 with the internal channel back side surface 70. The corners formed by the two internal channel side surfaces 68 and 70 with the internal channel bottom surface 72 are preferably square, but may be slightly rounded.

The relative orientations of the surfaces and channels of the frame section 18*a*, in combination with the shapes of the grip, provide the capability of detachably snapping various accessories to the frame 18. Further, the front channel 30 and rear channel 48 of the frame 18 extend over the entire frame 18, thereby providing the capability of snapping accessories on any of the sides of the frame 18, such as the left, right, top and bottom sides. For example, in FIG. 1 there is illustrated a number of accessories attached to the frame 18 of the message board 10, including a Mail Holder 104, a Notepad Holder 90, an Eraser and Holder 114, a Note Grip 134, a Tray 136, a pair of Key Holders 138, and a Pin-up Strip 140. Each of these accessories is provided with a grip adapted to snap onto the frame 18 via an interface with the front channel 30 and rear channel 44 of the frame 18, as more fully described below.

Figure 3:
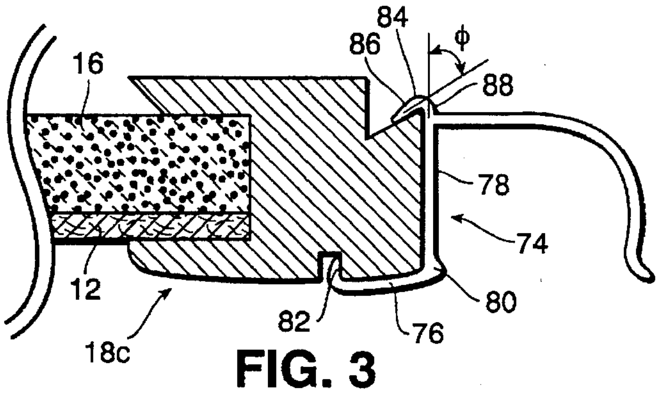
FIG. 3 is a cross-sectional view of a grip and a frame section of the message board of FIG. 1.

Turning to FIG. 3, there is shown a cross-sectional view of a grip 74 adapted to snap onto a frame section, e.g. 18*c*, of the frame 18. The grip 74 comprises a slightly curved front extension 76, a generally flat end extension 78, and a curved connecting portion 80 connecting the front extension 76 to the end extension 78. The front extension 76 has a length approximately equal to that of the front outside surface 38 of the frame section 18*c*, while the end extension 78 has a length approximately equal to that of the end surface 44 of the frame section 18*c*. The curved connecting portion 80 has a curved shape approximating that of the rounded corner 42 connecting the front outside surface 38 to the end surface 44 of the frame section 18*c*.

The grip 74 further comprises a tip 82 at an end of the front extension 76 opposite the connecting portion 80. The tip 82 comprises a short extension that juts a short distance out from the front extension 76 in a direction generally perpendicular to the portion of the front extension 76 to which the tip 82 is attached. The tip 82 is adapted to engage the front channel 30 of the frame section 18*c*, and therefore necessarily has a width roughly equal to, but not larger than, the distance $d_1$, and a length roughly equal to the distance $d_2$.

The grip 74 further comprises a curled lip 84 at an end of the end extension 78 opposite the connecting portion 80. The curled lip 84 comprises a lip extension 86 connected to the end extension 78 by a rounded corner 88. The lip extension 86 forms an angle ϕ with the end extension 78. The lip extension 86 is adapted to engage the rear channel 48 of the frame section 18*a*, and therefore necessarily has a length roughly equal to the length of the first rear channel side surface 50. Similarly, the angle ϕ formed between the lip extension 86 and the end extension 78 is necessarily approximately equal to β, where β is the angle defined by the first rear channel side surface 50 and the second rear channel side surface 52. Accordingly, the angle ϕ is about 59°.

The grip 74 thus forms a generally "C"-shaped member, with the tip 82 at one end of the "C" and the lip extension 86 at the other end of the "C". The grip 74, and the accessories, are preferably made of plastic, but could also be made of another flexible, resilient material.

As shown in FIG. 3, the relative orientations of the grip 74 and the frame 18 provide the grip 74 with the capability of snapping onto, and unsnapping from, the frame 18. More particularly, the lip extension 86 of the grip 74 is adapted to be received and retained in, or snap into, the rear channel 48 of the frame 18, while at the same time the tip 82 of the front extension 76 of the grip 74 is adapted to be received and retained in, or snap into, the front channel 30 of the frame 18. This is accomplished by first inserting the lip extension 86 of the grip 74 into the rear channel 48 of the frame section 18*a*. At this point, due to the length of the end surface 44 of the frame section 18*a* relative to the distance between the curled lip 84 and the tip 82 of the front extension 76 of the grip 74, the tip 82 of the front extension 76 of the grip 74 is unable to be lifted over the front outside surface 38 and placed in the front channel 30 without first causing the lip extension 86 to bend outward, i.e. increasing the angle ϕ between the lip extension 84 and the end extension 78 to greater than 59°. The bending outward of the lip extension 86 provides the capability of lifting the tip 82 of the front extension 76 over the front outside surface 38 of the frame section 18*a* and placing the tip 82 of the front extension 76 of the grip 74 into the front channel 30. Upon lifting the tip 82 of the front extension 76 over the front outside surface 38 of the frame section 18*a* and encountering the front channel 30, the tip 82 of the front extension 76 of the grip 74 "snaps" into the from channel 30 due to the force created in the grip 74 by the bending of the lip extension 86. The resilient forces of the tip 82 of the front extension 76 of the grip 74 and the lip extension 86 thereby hold the grip 74 in place on the frame section 18*a*.

When the grip 74 is snapped onto the frame section 18*a* as discussed above, the front extension 76 generally rests against the front outside surface 38 of the frame 18. Similarly, the end extension 78 of the grip 74 generally rests against the end surface 44 of the frame 18. To detach the grip 74, an outwardly directed force may be applied to the end extension 78 to displace the lip extension 82 from the rear channel 48, allowing easy removal of the tip 82 of the front extension 76 from the front channel 30. Alternatively, an outwardly directed force may be applied to the front extension 76 to displace the tip 82 from the front channel 30, allowing easy removal of the lip extension 86 from the rear channel 48.

Figure 4:
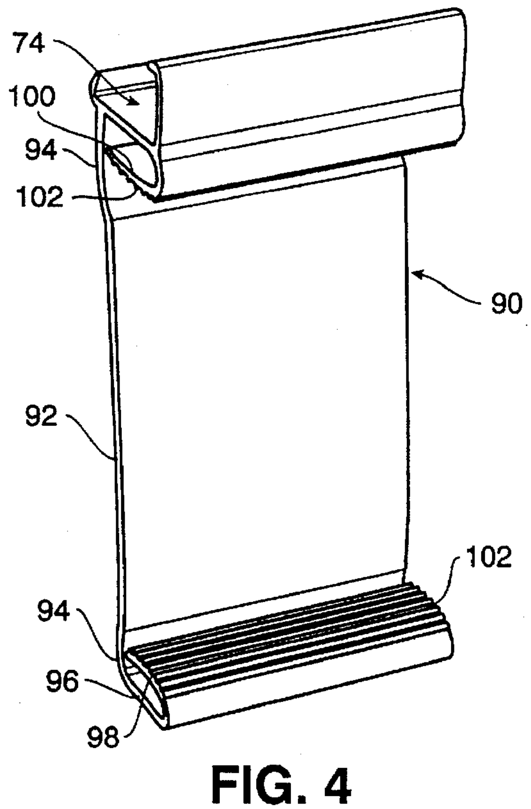
FIG. 4 is a perspective view of a Notepad Holder in accordance with a preferred form of the present invention.
Figure 5:
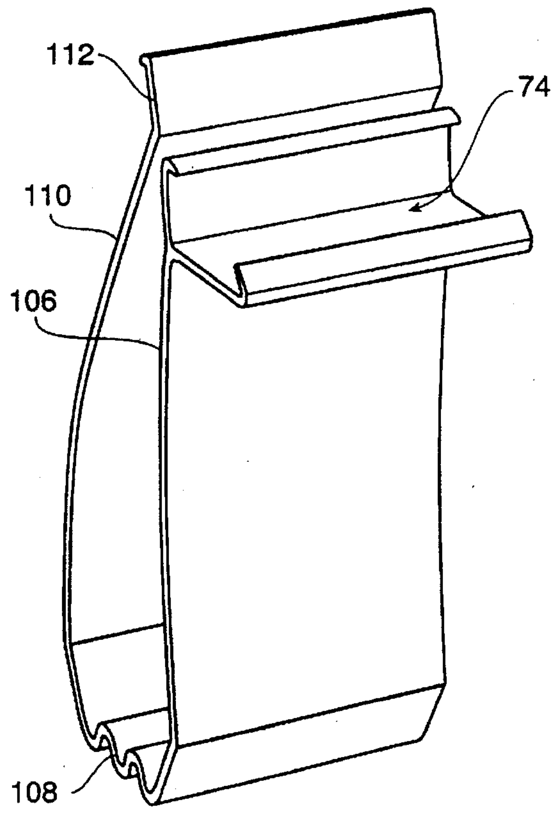
FIG. 5 is a perspective view of a Mail Holder in accordance with a preferred form of the present invention.
Figure 6:
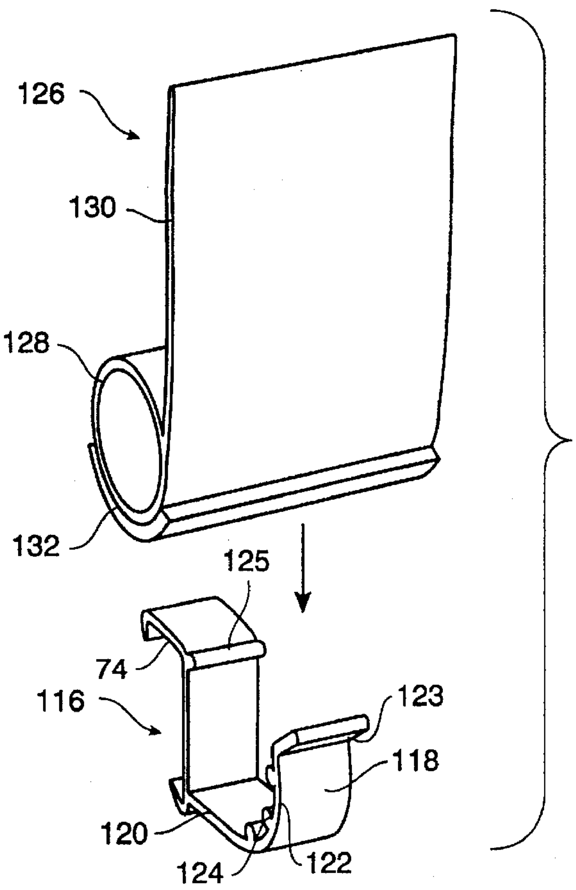
FIG. 6 is a perspective view of an Eraser and Holder in accordance with a preferred form of the present invention.

As discussed above, any number of accessories can be provided with a grip 74 as described above to provide the capability of snapping the accessory onto the message board 10. An accessory is a device to be attached to the frame 18 of the message board 10 to perform a desired function, and that is integrally formed with a grip 74 of the type shown and described herein. For example, in FIGS. 4, 5 and 6 there is illustrated, respectively, a Notepad Holder 90, a Mail Holder 104, and an Eraser and Holder 114, each adapted for use with the message board 10. Each of these accessories is more fully described below, it being understood that many other types of accessories are possible, such as those described above with respect to FIG. 1.

The Notepad Holder 90 comprises a grip 74, substantially as described above. The Notepad Holder further comprises a generally flat surface 92 that extends substantially perpendicularly from the back surface of the end extension 78 of the grip 74 and that is integrally formed with the grip 74. The flat surface 92 is attached to the end extension 78 at a point nearer to the curled lip 84 than to the connecting portion 80. The flat surface 92 has a slightly curved portion 94 at each of its ends, the first of which comprises the portion of the flat surface 92 that is attached to the grip 74. At the end of the flat surface 92 opposite the grip 74, there is a horseshoe-shaped upward extension 96 that is approximately perpendicular to the flat surface 92. The upward extension 96 extends perpendicular to the flat surface 92, then sharply curves 180° into a downward extending portion 98 that extends back downward toward the flat surface 92, thereby defining a horseshoe shape. The downward extending portion 98 of the upward extension 96 extends downward toward the flat surface 92, but does not re-connect to the flat surface 92. The Notepad Holder 90 further comprises a flap 100 that extends from the back surface of the grip 74, connecting to the grip 74 approximately at the connecting portion 80. The flap 100 extends initially outward away from the grip 74 and then curves sharply downward toward the flat surface 92. The flap 100 and the downward extending portion 98 of the upward extension 96 thereby form a pair of oppositely opposed surfaces. The exterior facing surfaces of the flap 100 and the downward extending portion 98 of the upward extension 96 are further provided with a plurality of raised beads 102.

The Notepad Holder 90 thus described provides the capability of receiving and retaining an appropriately sized notepad, or alternatively, a stack of Post-It Notes™. The notepad or Post-It Notes™ conveniently fit between the downward extending portion 98 of the upward extension 96 and the flap 100, each of which is capable of flexing by a slight amount to accommodate the notepad or Post-It Notes™. The raised beads 102 on and along the surfaces of the upward extension 96 and the flap 100 also aid in retaining the notepad or Post-It Notes™ in the Notepad Holder 90.

The Mail Holder 104 comprises a grip 74, substantially as described above. The Mail Holder 104 further comprises a flat surface 106 that is formed integrally with the grip 74 and that extends outward from the back surface of the grip 74. The flat surface 106 is attached to the grip 74 near the connecting portion 80, and is approximately perpendicular to the end extension 78. At the end of the flat surface 106 opposite the grip 74, there is provided a "W"-shaped base portion 108 of the Mail Holder 104. The base portion 108 is provided with a plurality of raised portions or waves 109, thus giving the base portion 108 a "W"-shape. In the embodiment shown in FIG. 5, there are two waves 109, it being understood that more or fewer waves 109 are possible. A gradually curving clip portion 110 is provided at the side of the base 108 opposite the flat surface 106. The clip portion 110 extends outward from the base 108 and gradually curves back toward the flat surface 106, terminating in an outwardly turned lip 112. The outwardly mined lip 112 abuts the from surface of the flat surface 106 near the point at which the flat surface 106 is attached to the grip 74.

The flat surface 106, the "W"-shaped base 108 and the gradually curving clip portion 110 of the Mail Holder 104 define a space adapted to receive and retain envelopes, pieces of paper, or other similarly shaped objects when the Mail Holder 104 is clipped to the bottom frame section 18*d* of the message board 10. The clip portion 110 and flat surface 106 combine to provide a slight clamping force to hold these items in place in the Mail Holder 104.

The Eraser and Holder 114 comprise two parts, an Eraser 126 and an Eraser Holder 116. The Eraser Holder 116 comprises a grip 74, substantially as described above. The Eraser Holder further comprises a curved extension 118 that is integrally formed with the grip 74 and that extends outwardly from the back surface of the grip 74. The curved extension 118 is attached to the back surface of the grip 74 at a point near the rounded corner 88 connecting the end extension 78 with the lip extension 86. The curved extension 118 has a first portion 120 that extends initially outward from the back surface of the grip 74 in a direction perpendicular to the end extension 78 of the grip 74, then gradually curves to form a second portion 122 that is approximately perpendicular to the first portion 120. The curved extension 118 terminates in an outwardly mined lip 123 at the end of the second portion 122. The curved extension 118 is further provided with a plurality of raised beads 124 disposed on and along the inside surface of the curved extension 118.

The Eraser Holder 116 further comprises a retaining bump 125 that is formed on the back surface of the connecting portion 80 of the grip 74. The Eraser Holder 116 thereby forms a generally "U"-shaped member adapted to receive the Eraser 126, as described below. The raised beads 124 provide an additional gripping force for the Eraser Holder 116 to grip the Eraser 126. The grip 74 of the Eraser Holder 116 provides the capability of snapping the Eraser Holder 116 onto a frame section, e.g. 18*b*, of the frame 18.

The Eraser 126 comprises a cylinder 128 having a tangentially extending flat surface 130, to thereby form a "b"-shaped member. The cylinder 128 is provided with a covering 132 of felt, cloth, or other substance suitable for erasing materials written on a dry-erase board. The felt covering 132 extends over approximately one-third of the external surface of the cylinder 128. As shown in FIG. 1, the Eraser Holder 116 is adapted to receive and retain the Eraser 126 while the Eraser Holder 116 is snapped onto the frame 18 of the message board 10. The "U"-shaped curved extension 118 is adapted to receive the Eraser 126, while the curved extension 118, the raised beads 124, and the raised bump 125 cooperate to provide a slight clamping force to retain the Eraser 126 in the Eraser Holder 116.

While the above description contains many specificities, these should not be construed as limitations on the scope of the invention, but rather as an exemplification of preferred embodiments thereof. Other variations are possible.

Accordingly, the scope of the present invention should be determined not by the embodiments illustrated above, but by the appended claims and their legal equivalents.

What is claimed is:

1. A message board comprising a bulletin board, and a frame fixedly attached to said bulletin board and having a front channel extending over a portion of a front external surface of at least two sides of the frame and a rear channel extending over a portion of a rear external surface of at least two sides of the frame, the front channel adapted to receive a first potion of a grip and the rear channel adapted to receive a second portion of a grip to thereby retain the grip on said frame.

2. The message board of claim 1, wherein the rear channel of said frame is defined by a first rear channel surface and a second rear channel surface, the first rear channel surface and second rear channel surface together defining an acute angle β.

3. A message board comprising a bulletin board, and a frame fixedly attached to said bulletin board and having a front channel extending over a portion of a front external surface of the frame and a rear channel extending over a portion of a rear external surface of the frame, the front channel adapted to receive a first portion of a grip and the rear channel adapted to receive a second portion of a grip to thereby retain the grip on said frame;

wherein said frame further comprises a front outside surface adjacent to the front channel and having a slight upward curve to facilitate attachment and detachment of the grip to said frame.

4. The message board of claim 3, further comprising a grip having a tip adapted to engage the front channel of said frame, and having a lip adapted to engage the rear channel of said frame.

5. The message board of claim 4 wherein said grip is made of plastic.

6. The message board of claim 4 wherein said grip is generally "C"-shaped.

7. An attachment mechanism for attaching an accessory to a fixed member, comprising a fixed member having a plurality of surfaces defining a from channel and a rear channel, a grip comprising a tip, a lip, and a body connecting said tip with said lip, wherein said tip is adapted to engage the from channel of said fixed member, and said lip is adapted to engage the rear channel of said fixed member, to thereby retain said grip on said fixed member; and wherein said fixed member further comprises a front outside surface adjacent to the front channel of said fixed member, the front outside surface having a slight upward curve to facilitate attachment and detachment of the grip to said fixed member.

8. The attachment mechanism of claim 7, further comprising a notepad holder integrally formed with said grip.

9. The attachment mechanism of claim 7, further comprising a mail holder integrally formed with said grip.

10. The attachment mechanism of claim 7, further comprising an eraser and holder integrally formed with said grip.

11. The attachment mechanism of claim 7, wherein the rear channel of said fixed member is defined by a first rear channel surface and a second rear channel surface, the first rear channel surface and second rear channel surface together defining an acute angle β.

12. An accessory for attaching to a fixed member, comprising a frame substantially surrounding a fixed member, said frame having a from channel extending over a portion of a front external surface of at least two sides of the frame and a rear channel extending over a portion of a rear external surface of at least two sides of the frame;

a grip comprising a front extension having an integrally formed tip, an end extension connected to said front extension by a connecting portion, said end extension having a curled lip, wherein the tip of said front extension and the curled lip of said end extension are adapted to fixedly engage the front channel and rear channel, respectively, of said frame, and a body integrally formed with said grip.

13. The accessory of claim 12, wherein said body is a Notepad Holder.

14. The accessory of claim 12, wherein said body is a Mail Holder.

15. The accessory of claim 12, wherein said body is an Eraser and Holder.

16. An accessory attachment mechanism comprising a frame attached to and substantially surrounding a member, said frame having a front channel extending over a portion of a front external surface of at least two sides of the frame and a rear channel extending over a portion of a rear external surface of at least two sides of the frame, the front channel adapted to receive a first portion of a grip and the rear channel adapted to receive a second portion of the grip to thereby retain the grip on said frame.

17. The accessory attachment mechanism of claim 16, wherein the rear channel of said frame is defined by a first rear channel surface and a second rear channel surface, the first rear channel surface and second rear channel surface together defining an acute angle β.

18. An accessory attachment mechanism comprising a frame attached to a member, said frame having a front channel extending over a portion of a front external surface of the frame and a rear channel extending over a portion of a rear external surface of the frame, the front channel adapted to receive a first portion of a grip and the rear channel adapted to receive a second portion of a grip to thereby retain the grip on said frame;

wherein said frame further comprises a front outside surface adjacent to the front channel and having a slight upward curve to facilitate attachment and detachment of the grip to said frame.

19. The accessory attachment mechanism of claim 18, further comprising a grip having a tip adapted to engage the front channel of said frame, and having a lip adapted to engage the rear channel of said frame.

20. The accessory attachment mechanism of claim 19 wherein said grip is made of plastic.

21. The accessory attachment mechanism of claim 19 wherein said grip is generally "C"-shaped.

* * * * *